(12) United States Patent
Seymour et al.

(10) Patent No.: US 7,963,498 B2
(45) Date of Patent: Jun. 21, 2011

(54) BRACKET ASSEMBLY

(75) Inventors: Douglas G. Seymour, York, PA (US); David Humphrey, York, PA (US); Michael J. Swantner, Warren, PA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 1624 days.

(21) Appl. No.: 10/737,048

(22) Filed: Dec. 16, 2003

(65) Prior Publication Data

US 2005/0127247 A1 Jun. 16, 2005

(51) Int. Cl.
*F16M 13/00* (2006.01)
(52) U.S. Cl. ......... 248/604; 248/560; 403/197; 411/525
(58) Field of Classification Search ............... 248/604, 248/601, 603, 560, 571, 573; 74/502.4, 502.6; 403/197, 194, 201; 411/525, 527; 174/669
See application file for complete search history.

(56) References Cited

U.S. PATENT DOCUMENTS

| | | | | |
|---|---|---|---|---|
| 3,351,974 A | * | 11/1967 | Wilhelmi | 16/2.1 |
| 3,516,111 A | * | 6/1970 | Heyman | 16/2.1 |
| 3,788,655 A | * | 1/1974 | Hathaway | 277/637 |
| 4,299,363 A | * | 11/1981 | Datschefski | 248/56 |
| 4,490,576 A | * | 12/1984 | Bolante et al. | 174/655 |
| 4,930,733 A | * | 6/1990 | Logsdon | 248/56 |
| 5,653,147 A | * | 8/1997 | Kelley et al. | 74/502.4 |
| 5,702,076 A | * | 12/1997 | Humber | 248/57 |
| 6,041,618 A | * | 3/2000 | Patel et al. | 62/503 |
| 6,189,407 B1 | * | 2/2001 | Champ et al. | 74/502.4 |
| 6,494,508 B1 | * | 12/2002 | Dreisbach et al. | 292/307 R |

* cited by examiner

*Primary Examiner* — Amy J Sterling
(74) *Attorney, Agent, or Firm* — Robert F. Clark

(57) ABSTRACT

An assemblage (8) comprises an electrical connector (10) having body (12) with a tubular projection (14) having a push-through portion (16) having a first diameter and an engaging portion (18) having a second diameter larger than the first diameter. A support (20) for the electrical connector (10) has a major part 22 that is substantially rigid and includes an aperture (24) formed by a plurality of deflectable spokes (26). The aperture (24) has a center opening (28) with a third diameter greater than the first diameter and less than the second diameter, whereby the tubular projection push-through portion (16) slides through the aperture (24) and the spokes (26) engage the second diameter of the engaging portion (18) and mount the electrical connector (10) with the support (20).

3 Claims, 2 Drawing Sheets

BRACKET ASSEMBLY

TECHNICAL FIELD

This invention relates to electrical connectors and more particularly to mounted electrical connectors.

BACKGROUND ART

Some electrical connectors, particularly for automotive use, have included a machined body of, for example, brass or nickel plated steel that had at least on portion that was press-fitted into a bracket. It was found that the press-fitting process occasionally skived small slivers of plating material off the inserted part when assembled to the bracket, and these skived slivers could cause a short circuit if they found their way into the insert. Subsequent attempts to relieve this problem eliminated the machined body in favor of a cast body of, for example, aluminum or zinc alloy. However, it was found that the using the cast body caused other problems because, when assembled to a bracket and subsequently heated in a soldering process, the heat caused a relaxing of the cast material causing the bracket to loosen and creating grounding problems.

DISCLOSURE OF INVENTION

It is, therefore, an object of the invention to obviate the disadvantages of the prior art.

It is another object of the invention to enhance electrical connectors.

It is yet another object of the invention to enhance an assemblage of connector and a support therefor.

These objects are accomplished, in one aspect of the invention, by the provision of an assemblage that comprises an electrical connector having body with a tubular projection having a push-through portion with a first diameter and an engaging portion having a second diameter larger than the first diameter. A support for the electrical connector has a major part that is substantially rigid and includes an aperture formed by a plurality of deflectable spokes. The aperture has a center opening with a third diameter that is greater than the first diameter and less than the second diameter, whereby the tubular projection push-through portion slides through the aperture and the spokes engage the second diameter of the engaging portion and mount the electrical connector with the support.

The spokes function as flexible beams during the assembly process which deflect to accept the insert and remain under load after the assembly is competed. When heat is applied for the soldering process and the casting relaxes, the beam dig into the cast insert and provide adequate support which insures a good ground. Further, the elimination of the skiving problem reduces the possibility of electrical short circuits.

BEST MODE FOR CARRYING OUT THE INVENTION

For a better understanding of the present invention, together with other and further objects, advantages and capabilities thereof, reference is made to the following disclosure and appended claims in conjunction with the above-described drawings.

Figure 1:
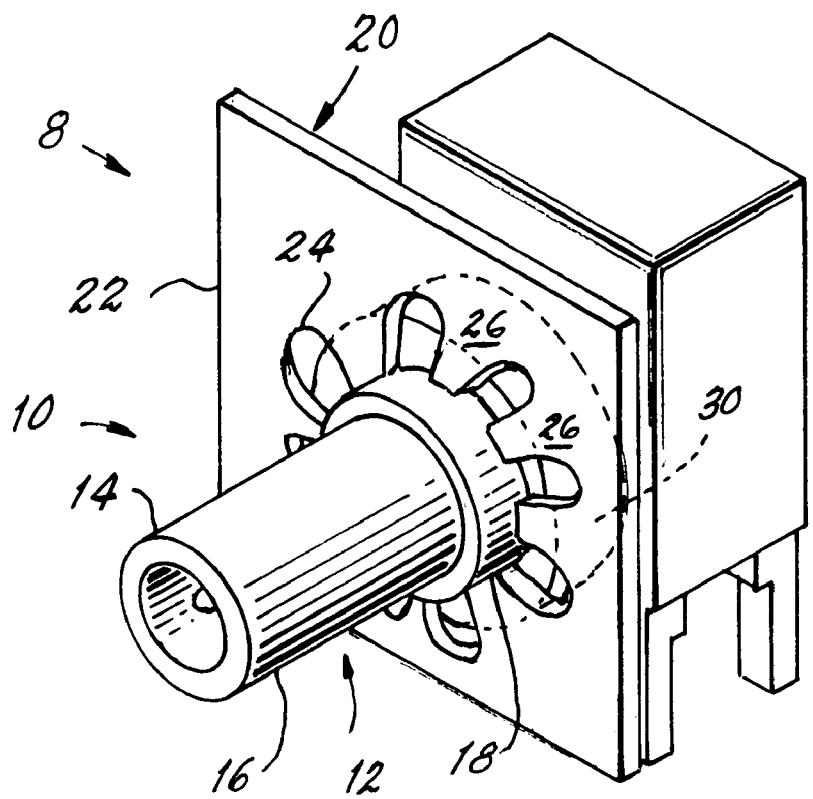
FIG. 1 is a perspective view of an assemblage of electrical connector and support in accordance with an aspect of the invention.
Figure 2:
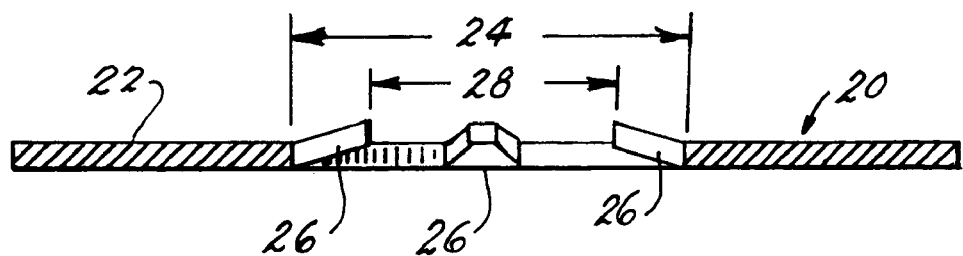
FIG. 2 is an elevational, section view of the support.

Referring now to the drawings in greater detail, there is shown in FIG. 1 an assemblage 8 comprised of an electrical connector or insert 10 having body 12 with a tubular projection 14 having a push-through portion 16 having a first diameter and an engaging portion 18 having a second diameter larger than the first diameter. A support 20 for the electrical connector has a major part 22 that is substantially rigid and includes an aperture 24 formed by a plurality of deflectable spokes or beams 26. The support is preferably made from Sn/Pb plated steel. The aperture 24 has a center opening 28 with a third diameter that is greater than the first diameter and less than the second diameter, whereby the tubular projection push-through portion 16 slides through the aperture 24 and the spokes 26 engage the second diameter of the engaging portion 18 and mount said electrical connector 10 with the support 20.

Figure 3:
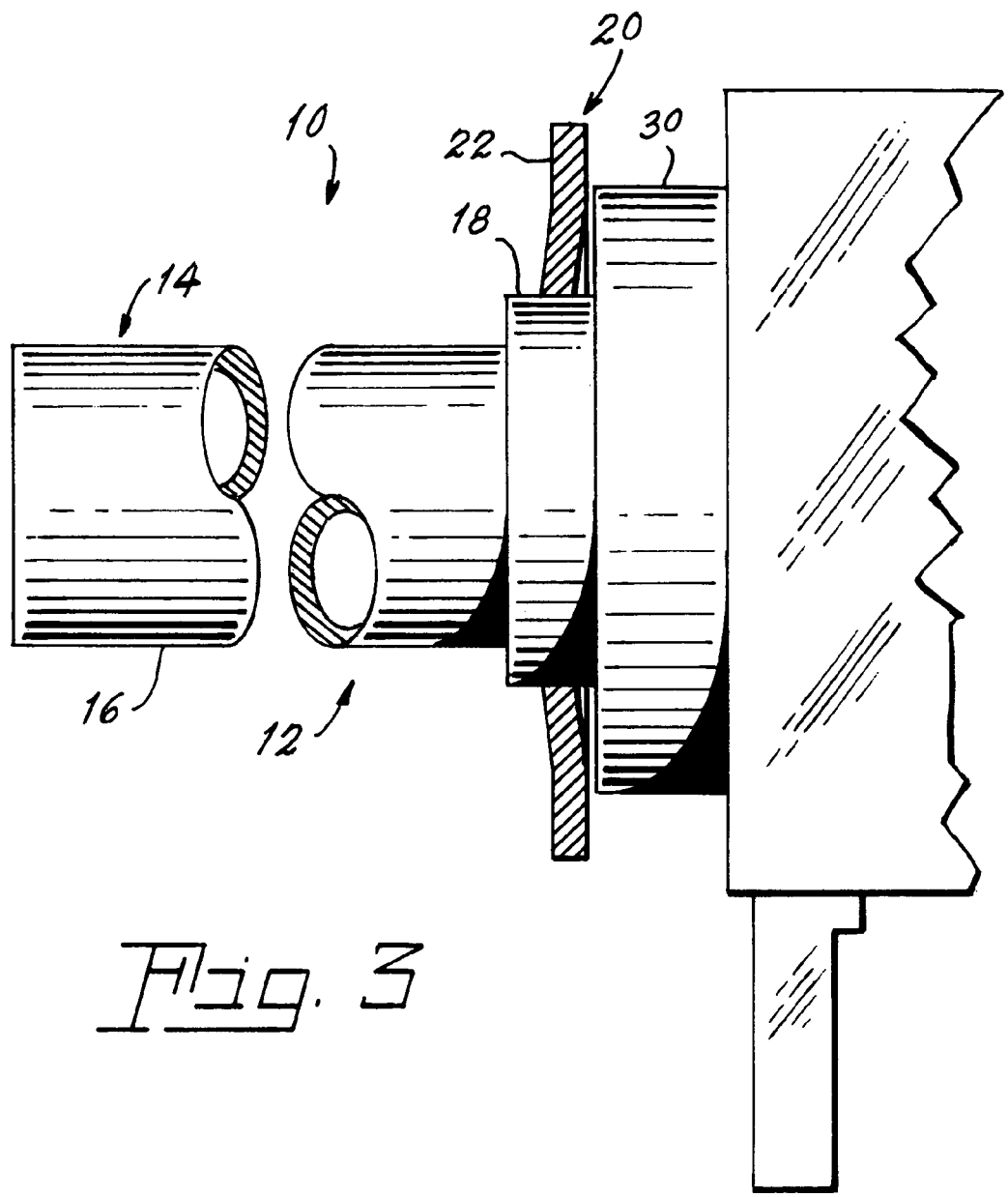
FIG. 3 is an elevational view of an electrical connector and support, partially in section.

A stop 30 (see particularly FIG. 3) which, in a preferred embodiment, can be another diameter formed behind the engaging portion 18, limits the amount of insertion of the electrical connector into the support 20.

Also, in a preferred embodiment, the spokes 26 are formed to diverge away from the plane of the major part 22 of the support 20 to aid in the insertion process.

Because of the flexing capability of the spokes 26, skiving is eliminated, thus greatly reducing the possibility of short circuits developing.

Additionally, upon heating, the spokes will actually dig into the cast insert body as it relaxes from the heat applied during a soldering operation allowing the support/insert interface to remain tightly assembled and provide good and continuing ground connection for the connector.

While there have been shown and described what are at present considered to be the preferred embodiments of the invention, it will be apparent to those skilled in the art that various changes and modification can be made herein without departing from the scope of the invention as defined by the appended claims.

What is claimed is:

1. An assemblage comprising:
   an electrical connector having a metal body with a tubular projection having a push-through portion having a first diameter and an engaging portion having a second diameter larger than said first diameter;
   and a metal support having a major part that is substantially rigid and includes an aperture formed by a plurality of deflectable spokes, said aperture having a center opening with a third diameter greater than said first diameter and less than said second diameter, whereby said tubular projection push-through portion slides through said aperture and said spokes engage said second diameter of said engaging portion and mount said electrical connector with said support.

2. The assemblage of claim 1 wherein a stop associated with said second diameter limits the amount of movement possible for said support.

3. The assemblage of claim 2 wherein said spokes of said support diverge away from the plane of said major part of said support.

* * * * *